United States Patent
Kwon et al.

(10) Patent No.: US 9,726,261 B1
(45) Date of Patent: Aug. 8, 2017

(54) PLANETARY GEAR TRAIN OF AUTOMATIC TRANSMISSION FOR VEHICLE

(71) Applicant: Hyundai Motor Company, Seoul (KR)

(72) Inventors: Hyun Sik Kwon, Seoul (KR); Jae Chang Kook, Hwaseong-si (KR); Seongwook Ji, Gunpo-si (KR); Wonmin Cho, Hwaseong-si (KR); Wookjin Jang, Yongin-si (KR); Seong Wook Hwang, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/265,054

(22) Filed: Sep. 14, 2016

(30) Foreign Application Priority Data

Mar. 18, 2016 (KR) .......................... 10-2016-0032989

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2041* (2013.01); *F16H 2200/2046* (2013.01)

(58) Field of Classification Search
None
See application file for complete search history.

(56) References Cited

U.S. PATENT DOCUMENTS

| 2008/0009384 | A1* | 1/2008 | Diosi | F16H 3/66 475/282 |
| 2009/0239699 | A1* | 9/2009 | Baldwin | F16H 3/66 475/276 |
| 2016/0319911 | A1* | 11/2016 | Park | F16H 3/66 |
| 2016/0356345 | A1* | 12/2016 | Ji | F16H 3/66 |
| 2016/0356348 | A1* | 12/2016 | Lee | F16H 3/66 |
| 2016/0356350 | A1* | 12/2016 | Lee | F16H 3/66 |
| 2017/0074369 | A1* | 3/2017 | Park | F16H 3/66 |

* cited by examiner

*Primary Examiner* — Justin Holmes
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting torque of the engine, a first planetary gear set, a second planetary gear set, a third planetary gear set, a fourth planetary gear set, a first shaft directly connected to the input shaft, a second shaft directly connected to the output shaft, a third shaft, a fourth shaft selectively connectable to the third shaft, a fifth shaft selectively connectable to the third shaft, a sixth shaft, a seventh shaft, and an eighth shaft selectively connectable to the second shaft and the fourth shaft.

9 Claims, 2 Drawing Sheets

FIG. 2

| speed stages | control element | | | | | | gear ratio |
|---|---|---|---|---|---|---|---|
| | C1 | C2 | C3 | C4 | B1 | B2 | |
| D1 | ● | | | | | ● | 4.938 |
| D2 | | | ● | | | ● | 2.496 |
| D3 | ● | | ● | | | ● | 1.982 |
| D4 | | ● | | ● | | ● | 1.627 |
| D5 | ● | ● | | ● | | ● | 1.439 |
| D6 | ● | ● | | ● | | | 1.000 |
| D7 | ● | ● | | | ● | | 0.697 |
| D8 | | | | ● | ● | | 0.517 |
| D9 | ● | | | ● | ● | | 0.455 |
| D10 | | | ● | ● | ● | | 0.408 |
| REV | | | ● | | ● | ● | 4.765 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2016-0032989, filed Mar. 18, 2016, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving ten forward speed stages with a minimum number of constituent elements being used and improves silent driving of the vehicle by using operation point positioned at a low engine speed.

Description of Related Art

Generally, an automatic transmission achieving more speed stages has been developed to enhance fuel economy and optimize drivability. Recent increases in oil prices are triggering stiff competition in enhancing fuel consumption of a vehicle.

Therefore, much research for reducing weight and enhancing fuel economy through downsizing of an engine, and for securing drivability and fuel economy through multiple speed stages of automatic transmissions has been developed.

However, in the automatic transmission, as the number of speed stages increase, the number of internal components (particularly, planetary gear sets) increase, and as a result, a length of the transmission increases. This may deteriorate installability and/or power flow efficiency and may increase production cost, and weight.

Accordingly, development of a planetary gear train which may achieve maximum efficiency with a small number of components is important in order to increase a fuel economy enhancement effect through the multiple speed-stages.

In this aspect, in recent years, 8-speed automatic transmissions tend to be implemented and the research and development of a planetary gear train capable of implementing more speed stages has also been actively conducted.

However, a conventional 8-speed automatic transmission typically includes three to four planetary gear sets and five to six control elements (frictional elements). In this case, since the length of the automatic transmission increases, mountability may be deteriorated.

In recent planetary gear trains, one planetary gear set is disposed above another planetary gear set, but structures of automatic transmissions to which parallel planetary gear sets is applied are very limited.

In other planetary gear trains, dog clutches instead of control elements of wet-type are used. However, shift feel can be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving at least ten forward speed stages and one reverse speed stage.

Additionally, various aspects of the present invention are directed to providing a planetary gear train of an automatic transmission for a vehicle having further advantages of improving silent driving of the vehicle by using operation point positioned at a low rotational speed region of an engine.

According to various aspects of the present invention, a planetary gear train of an automatic transmission for a vehicle may include an input shaft receiving torque of an engine, an output shaft outputting torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, a first shaft connecting the first rotation element to the fourth rotation element and directly connected to the input shaft, a second shaft connected to the second rotation element and directly connected to the output shaft, a third shaft connected to the third rotation element, a fourth shaft connecting the fifth rotation element to the eighth rotation element and selectively connectable to the third shaft, a fifth shaft connecting the sixth rotation element to the twelfth rotation element and selectively connectable to the third shaft, a sixth shaft connecting the seventh rotation element to the tenth rotation element, a seventh shaft connected to the ninth rotation element, and an eighth shaft connected to the eleventh rotation element and selectively connectable to the second shaft and the fourth shaft.

The sixth shaft and the seventh shaft may each be selectively connectable to a transmission housing.

The first, second, and third rotation elements may be a first sun gear, a first planet carrier, and a first ring gear, the fourth, fifth, and sixth rotation elements may be a second sun gear, a second planet carrier, and a second ring gear, the seventh, eighth, and ninth rotation elements may be a third sun gear, a third planet carrier, and a third ring gear, and the tenth, eleventh, and twelfth rotation elements may be a fourth sun gear, a fourth planet carrier, and a fourth ring gear.

The planetary gear train may further include a first clutch selectively connecting the second shaft to the eighth shaft, a second clutch selectively connecting the third shaft to the fourth shaft, a third clutch selectively connecting the third shaft to the fifth shaft, a fourth clutch selectively connecting the fourth shaft to the eighth shaft, a first brake selectively connecting the sixth shaft to the transmission housing, and a second brake selectively connecting the seventh shaft to the transmission housing.

According to various aspects of the present invention, a planetary gear train of an automatic transmission for a vehicle may include an input shaft receiving torque of an engine, an output shaft outputting torque of the engine, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements, in which the input shaft may be directly connected to the first rotation element, the output shaft may be directly connected to the second rotation element, the first rotation element may be directly connected to the fourth rotation element, the fifth rotation element may be selectively connectable to the third rotation element, the sixth rotation element may be selectively connectable to the third rotation element, the eighth rotation element may be directly connected to the fifth rotation element, the tenth rotation element may be directly connected to the seventh rotation element, the eleventh rotation element may be selectively connectable respectively to the second rotation element and the fifth rotation element, and the twelfth rotation element may be directly connected to the sixth rotation element.

The e seventh rotation element and the ninth rotation element may each be selectively connectable to a transmission housing.

The planetary gear train may further include a first clutch selectively connecting the second rotation element to the eleventh rotation element, a second clutch selectively connecting the third rotation element to the fifth rotation element, a third clutch selectively connecting the third rotation element to the sixth rotation element, a fourth clutch selectively connecting the eighth rotation element to the eleventh rotation element, a first brake selectively connecting the seventh rotation element to the transmission housing, and a second brake selectively connecting the ninth rotation element to the transmission housing.

Speed stages implemented by selectively operating the first, second, third and fourth clutches and the first and second brakes may include a forward first speed stage, implemented by operating the first and third clutches, and the second brake, a forward second speed stage, implemented by operating the third and fourth clutches, and the second brake, a forward third speed stage, implemented by operating the first and fourth clutches, and the second brake, a forward fourth speed stage, implemented by operating the second and fourth clutches and the second brake, a forward fifth speed stage, implemented by operating the first and second clutches and the second brake, a forward sixth speed stage, implemented by operating the first, second and fourth clutches, a forward seventh speed stage, implemented by operating the first and second clutches, and the first brake, a forward eighth speed stage, implemented by operating the second and fourth clutches and the first brake, a forward ninth speed stage, implemented by operating the first and fourth clutches, and the first brake, a forward tenth speed stage, implemented by operating the third and fourth clutches, and the first brake, and a reverse-speed stage, implemented by operating the third clutch, and the first and second brakes.

The planetary gear train according to various embodiments of the present invention achieves ten forward speed stages and one reverse speed stage by combining four planetary gear sets with six control elements.

In addition, the planetary gear train according to various embodiments of the present invention achieves speed stages suitable to a rotational speed of the engine due to multiple-speed stages of the automatic transmission. Particularly, silent driving of the vehicle is improved by using operation point positioned at a low rotational speed region of an engine.

Furthermore, the planetary gear train according to various embodiments of the present invention maximizes driving efficiency of the engine and improves power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to various embodiments of the present invention.

Figure 1:
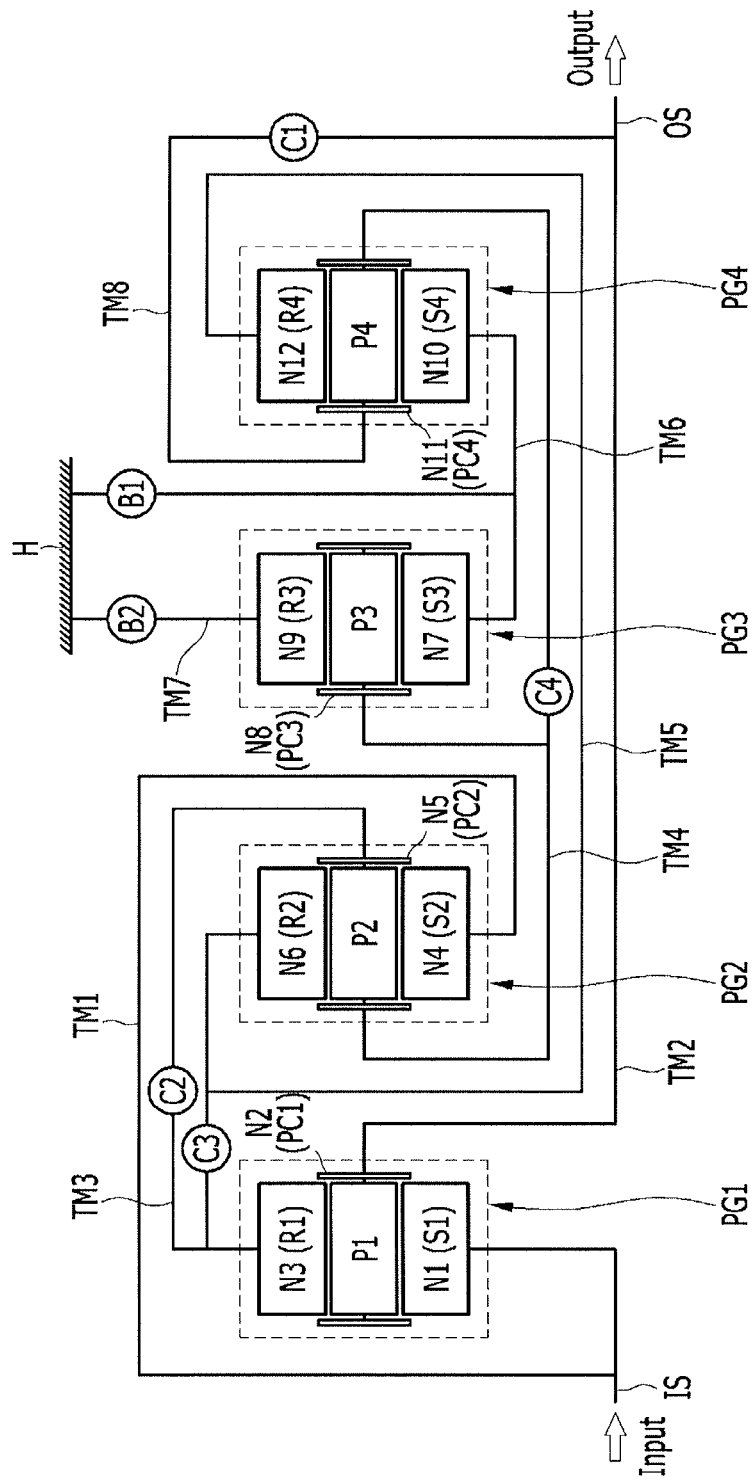
FIG. 1 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, eight rotation shafts TM1 to TM8 connected to at least one of rotation elements of the first, second, third, and fourth planetary gear sets PG1, PG2, PG3, and PG4, four clutches C1 to C4 and two brakes B1 and B2 that are control elements, and a transmission housing H.

Torque input from the input shaft IS is changed by cooperation of the first, second, third, and fourth planetary gear sets PG1, PG2, PG3, and PG4 and the changed torque is output through the output shaft OS.

The planetary gear sets are disposed in the order of first, second, third and fourth planetary gear sets PG1, PG2, PG3 and PG4 from an engine side.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotation element N1 is directly connected to the fourth rotation element 4, the fifth rotation element N5 is directly connected to the eighth rotation element N8, the sixth rotation element N6 is directly connected to the twelfth rotation element N12, and the seventh rotation element N7 is directly connected to the tenth rotation element N10 such that the first, second, third, and fourth planetary gear sets PG1, PG2, PG3, and PG4 include eight rotation shaft TM1 to TM8.

The eight rotation shafts TM1 to TM8 will be described in detail.

The eight shafts TM1 to TM8 directly connects a plurality of rotation elements among the rotation elements of the planetary gear sets PG1, PG2, PG3, and PG4, are rotation members that are directly connected to at least one rotation element of the planetary gear sets PG1, PG2, PG3, and PG4 and rotate with the at least one rotation element to transmit torque, or are fixed members that directly connect at least one rotation element of the planetary gear sets PG1, PG2, PG3, and PG4 to the transmission housing H to fix the at least one rotation element.

The first shaft TM1 directly connects the first rotation element N1 (first sun gear S1) to the fourth rotation element N4 (second sun gear S2) and is directly connected to the input shaft IS so as to be continuously operated as an input element.

The second shaft TM2 is connected to the second rotation element N2 (first planet carrier PC1) and is directly connected to the output shaft OS so as to be continuously operated as an output element.

The third shaft TM3 is connected to the third rotation element N3 (first ring gear R1).

The fourth shaft TM4 directly connects the fifth rotation element N5 (second planet carrier PC2) to the eighth rotation element N8 (third planet carrier PC3) and is selectively connectable to the third shaft TM3.

The fifth shaft TM5 directly connects the sixth rotation element N6 (second ring gear R2) to the twelfth rotation element N12 (fourth ring gear R4) and is selectively connectable to the third shaft TM3.

The sixth shaft TM6 directly connects the seventh rotation element N7 (third sun gear S3) to the tenth rotation element N10 (fourth sun gear S4) and is selectively connectable to the transmission housing H so as to be operated as a selective fixed element.

The seventh shaft TM7 is connected to the ninth rotation element N9 (third ring gear R3) and is selectively connectable to the transmission housing H so as to be operated as a selective fixed element.

The eighth shaft TM8 is connected to the eleventh rotation element N11 (fourth planet carrier PC4) and is selectively connectable respectively to the second shaft TM2 and the fourth shaft TM4.

In addition, four clutches C1, C2, C3, and C4 are disposed at positions at which any two shafts among the eight shafts TM1 to TM8 including the input shaft IS and the output shaft OS are selectively connectable to each other.

In addition, two brakes B1 and B2 are disposed at positions at which at least one shaft among the eight shafts TM1 to TM8 is selectively connectable to the transmission housing H.

Arrangements of the four clutches C1 to C4 and the two brakes B1 and B2 are described in detail.

The first clutch C1 is disposed between the second shaft TM2 and the eighth shaft TM8 and selectively connects the second shaft TM2 to the eighth shaft TM8.

The second clutch C2 is disposed between the third shaft TM3 and the fourth shaft TM4 and selectively connects the third shaft TM3 to the fourth shaft TM4.

The third clutch C3 is disposed between the third shaft TM3 and the fifth shaft TM5 and selectively connects the third shaft TM3 to the fifth shaft TM5.

The fourth clutch C4 is disposed between the fourth shaft TM4 and the eighth shaft TM8 and selectively connects the fourth shaft TM4 to the eighth shaft TM8.

The first brake B1 is disposed between the sixth shaft TM6 and the transmission housing H and selectively connects the sixth shaft TM6 to the transmission housing H.

The second brake B2 is disposed between the seventh shaft TM7 and the transmission housing H and selectively connects the seventh shaft TM7 to the transmission housing H.

The control elements including the first, second, third, and fourth clutches C1, C2, C3, and C4 and the first and second brakes B1 and B2 may be multi-plates friction elements of wet type that are operated by hydraulic pressure.

FIG. 2 is an operation chart of control elements at each speed stage in the planetary gear train according to various embodiments of the present invention.

As shown in FIG. 2, three control elements among the first, second, third, and fourth clutches C1, C2, C3, and C4 and the first and second brakes B1 and B2 that are control elements are operated at each speed stage in the planetary gear train according to various embodiments of the present invention.

The first and third clutches C1 and C3 and the second brake B2 are operated at a first forward speed stage D1.

In a state that the second shaft TM2 is connected to the eighth shaft TM8 by operation of the first clutch C1 and the third shaft TM3 is connected to the fifth shaft TM5 by operation of the third clutch C3, torque of the input shaft IS is input to the first shaft TM1.

In addition, the seventh shaft TM7 is operated as the fixed element by operation of the second brake B2. Therefore, the torque of the input shaft IS is shifted into the first forward speed stage, and the first forward speed stage is output through the output shaft OS connected to the second shaft TM2.

The third and fourth clutches C3 and C4 and the second brake B2 are operated at a second forward speed stage D2.

In a state that the third shaft TM3 is connected to the fifth shaft TM5 by operation of the third clutch C3 and the fourth shaft TM4 is connected to the eighth shaft TM8 by operation of the fourth clutch C4, the torque of the input shaft IS is input to the first shaft TM1.

In addition, the seventh shaft TM7 is operated as the fixed element by operation of the second brake B2. Therefore, the torque of the input shaft IS is shifted into the second forward speed stage, and the second forward speed stage is output through the output shaft OS connected to the second shaft TM2.

The first and fourth clutches C1 and C4 and the second brake B2 are operated at a third forward speed stage D3.

In a state that the second shaft TM2 is connected to the eighth shaft TM8 by operation of the first clutch C1 and the fourth shaft TM4 is connected to the eighth shaft TM8 by operation of the fourth clutch C4, the torque of the input shaft IS is input to the first shaft TM1.

In addition, the seventh shaft TM7 is operated as the fixed element by operation of the second brake B2. Therefore, the torque of the input shaft IS is shifted into the third forward speed stage, and the third forward speed stage is output through the output shaft OS connected to the second shaft TM2.

The second and fourth clutches C2 and C4 and the second brake B2 are operated at a fourth forward speed stage D4.

In a state that the third shaft TM3 is connected to the fourth shaft TM4 by operation of the second clutch C2 and the fourth shaft TM4 is connected to the eighth shaft TM8 by operation of the fourth clutch C4, the torque of the input shaft IS is input to the first shaft TM1.

In addition, the seventh shaft TM7 is operated as the fixed element by operation of the second brake B2. Therefore, the torque of the input shaft IS is shifted into the fourth forward speed stage, and the fourth forward speed stage is output through the output shaft OS connected to the second shaft TM2.

The first and second clutches C1 and C2 and the second brake B2 are operated at a fifth forward speed stage D5.

In a state that the second shaft TM2 is connected to the eighth shaft TM8 by operation of the first clutch C1 and the third shaft TM3 is connected to the fourth shaft TM4 by operation of the second clutch C2, the torque of the input shaft IS is input to the first shaft TM1.

In addition, the seventh shaft TM7 is operated as the fixed element by operation of the second brake B2. Therefore, the torque of the input shaft IS is shifted into the fifth forward speed stage, and the fifth forward speed stage is output through the output shaft OS connected to the second shaft TM2.

The first, second, and fourth clutches C1, C2, and C4 are operated at a sixth forward speed stage D6.

In a state that the second shaft TM2 is connected to the eighth shaft TM8 by operation of the first clutch C1, the third shaft TM3 is connected to the fourth shaft TM4 by operation of the second clutch C2, and the fourth shaft TM4 is connected to the eighth shaft TM8 by operation of the fourth clutch C4, the torque of the input shaft IS is input to the first shaft TM1.

In this case, the planetary gear sets PG1, PG2, PG3, and PG4 become lock-up states and the sixth forward speed stage is output through the output shaft OS connected to the second shaft TM2. At the sixth forward speed stage, the same rotation speed as the input shaft IS is output.

The first and second clutches C1 and C2 and the first brake B1 are operated at a seventh forward speed stage D7.

In a state that the second shaft TM2 is connected to the eighth shaft TM8 by operation of the first clutch C1 and the third shaft TM3 is connected to the fourth shaft TM4 by operation of the second clutch C2, the torque of the input shaft IS is input to the first shaft TM1.

In addition, the sixth shaft TM6 is operated as the fixed element by operation of the first brake B1. Therefore, the torque of the input shaft IS is shifted into the seventh forward speed stage, and the seventh forward speed stage is output through the output shaft OS connected to the second shaft TM2.

The second and fourth clutches C2 and C4 and the first brake B1 are operated at an eighth forward speed stage D8.

In a state that the third shaft TM3 is connected to the fourth shaft TM4 by operation of the second clutch C2 and the fourth shaft TM4 is connected to the eighth shaft TM8 by operation of the fourth clutch C4, the torque of the input shaft IS is input to the first shaft TM1.

In addition, the sixth shaft TM6 is operated as the fixed element by operation of the first brake B1. Therefore, the torque of the input shaft IS is shifted into the eighth forward speed stage, and the eighth forward speed stage is output through the output shaft OS connected to the second shaft TM2.

The first and fourth clutches C1 and C4 and the first brake B1 are operated at a ninth forward speed stage D9.

In a state that the second shaft TM2 is connected to the eighth shaft TM8 by operation of the first clutch C1 and the fourth shaft TM4 is connected to the eighth shaft TM8 by operation of the fourth clutch C4, the torque of the input shaft IS is input to the first shaft TM1.

In addition, the sixth shaft TM6 is operated as the fixed element by operation of the first brake B1. Therefore, the torque of the input shaft IS is shifted into the ninth forward speed stage, and the ninth forward speed stage is output through the output shaft OS connected to the second shaft TM2.

The third and fourth clutches C3 and C4 and the first brake B1 are operated at a tenth forward speed stage D10.

In a state that the third shaft TM3 is connected to the fifth shaft TM5 by operation of the third clutch C3 and the fourth shaft TM4 is connected to the eighth shaft TM8 by operation of the fourth clutch C4, the torque of the input shaft IS is input to the first shaft TM1.

In addition, the sixth shaft TM6 is operated as the fixed element by operation of the first brake B1. Therefore, the torque of the input shaft IS is shifted into the tenth forward speed stage, and the tenth forward speed stage is output through the output shaft OS connected to the second shaft TM2.

The third clutch C3 and the first and second brakes B1 and B2 are operated at a reverse speed stage REV.

In a state that the third shaft TM3 is connected to the fifth shaft TM5 by operation of the third clutch C3, the torque of the input shaft IS is input to the first shaft TM1.

In addition, the sixth shaft TM6 and the seventh shaft TM7 are operated as the fixed elements by operation of the first and second brakes B1 and B2. Therefore, the torque of the input shaft IS is shifted into the reverse speed stage, and the reverse speed stage is output through the output shaft OS connected to the second shaft TM2.

The planetary gear trains according to various embodiments of the present invention achieves at least ten forward speed stages and one reverse speed stage by combining four planetary gear sets PG1, PG2, PG3, and PG4 with the four clutches C1, C2, C3, and C4 and the two brakes B1 and B2.

In addition, the planetary gear train according to various embodiments of the present invention achieves suitable speed stages according to rotation speed of the engine. Particularly, silent driving of the vehicle is improved by using operation point positioned at a low rotational speed region of the engine.

Furthermore, the planetary gear train according to various embodiments of the present invention maximizes driving efficiency of the engine and improves power delivery performance and fuel consumption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A planetary gear train of an automatic transmission for a vehicle comprising:
    an input shaft receiving torque of an engine;
    an output shaft outputting torque of the engine;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    a first shaft connecting the first rotation element to the fourth rotation element and directly connected to the input shaft;
    a second shaft connected to the second rotation element and directly connected to the output shaft;
    a third shaft connected to the third rotation element;
    a fourth shaft connecting the fifth rotation element to the eighth rotation element and selectively connectable to the third shaft;
    a fifth shaft connecting the sixth rotation element to the twelfth rotation element and selectively connectable to the third shaft;
    a sixth shaft connecting the seventh rotation element to the tenth rotation element;
    a seventh shaft connected to the ninth rotation element; and
    an eighth shaft connected to the eleventh rotation element and selectively connectable to the second shaft and the fourth shaft.

2. The planetary gear train of claim 1, wherein the sixth shaft and the seventh shaft are each selectively connectable to a transmission housing.

3. The planetary gear train of claim 1, wherein the first rotation element, the second rotation element, and the third rotation element comprise a first sun gear, a first planet carrier, and a first ring gear,
    the fourth rotation element, the fifth rotation element, and the sixth rotation element comprise a second sun gear, a second planet carrier, and a second ring gear,
    the seventh rotation element, the eighth rotation element, and the ninth rotation element comprise a third sun gear, a third planet carrier, and a third ring gear, and
    the tenth rotation element, the eleventh rotation element, and the twelfth rotation element comprise a fourth sun gear, a fourth planet carrier, and a fourth ring gear.

4. The planetary gear train of claim 2, further comprising:
    a first clutch selectively connecting the second shaft to the eighth shaft;
    a second clutch selectively connecting the third shaft to the fourth shaft;
    a third clutch selectively connecting the third shaft to the fifth shaft;
    a fourth clutch selectively connecting the fourth shaft to the eighth shaft;
    a first brake selectively connecting the sixth shaft to the transmission housing; and
    a second brake selectively connecting the seventh shaft to the transmission housing.

5. A planetary gear train of an automatic transmission for a vehicle comprising:
    an input shaft receiving torque of an engine;
    an output shaft outputting torque of the engine;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element; and
    a fourth planetary gear set including a tenth rotation element, an eleventh rotation element, and a twelfth rotation element,
    wherein the input shaft is directly connected to the first rotation element,
    the output shaft is directly connected to the second rotation element,
    the first rotation element is directly connected to the fourth rotation element,
    the fifth rotation element is selectively connectable to the third rotation element,
    the sixth rotation element is selectively connectable to the third rotation element,
    the eighth rotation element is directly connected to the fifth rotation element,
    the tenth rotation element is directly connected to the seventh rotation element,
    the eleventh rotation element is selectively connectable respectively to the second rotation element and the fifth rotation element, and
    the twelfth rotation element is directly connected to the sixth rotation element.

6. The planetary gear train of claim 5, wherein the seventh rotation element and the ninth rotation element are each selectively connectable to a transmission housing.

7. The planetary gear train of claim 5, wherein the first rotation element, the second rotation element, and the third rotation element comprise a first sun gear, a first planet carrier, and a first ring gear,
the fourth rotation element, the fifth rotation element, and the sixth rotation element comprise a second sun gear, a second planet carrier, and a second ring gear,
the seventh rotation element, the eighth rotation element, and the ninth rotation element comprise a third sun gear, a third planet carrier, and a third ring gear, and
the tenth rotation element, the eleventh rotation element, and the twelfth rotation element comprise a fourth sun gear, a fourth planet carrier, and a fourth ring gear.

8. The planetary gear train of claim 6, further comprising:
a first clutch selectively connecting the second rotation element to the eleventh rotation element;
a second clutch selectively connecting the third rotation element to the fifth rotation element;
a third clutch selectively connecting the third rotation element to the sixth rotation element;
a fourth clutch selectively connecting the eighth rotation element to the eleventh rotation element;
a first brake selectively connecting the seventh rotation element to the transmission housing; and
a second brake selectively connecting the ninth rotation element to the transmission housing.

9. The planetary gear train of claim 8, wherein speed stages implemented by selectively operating the first, second, third and fourth clutches and the first and second brakes include:
a first forward speed stage, implemented by operating the first and third clutches, and the second brake;
a second forward speed stage, implemented by operating the third and fourth clutches, and the second brake;
a third forward speed stage, implemented by operating the first and fourth clutches, and the second brake;
a fourth forward speed stage, implemented by operating the second and fourth clutches and the second brake;
a fifth forward speed stage, implemented by operating the first clutch and the second clutch and the second brake;
a sixth forward speed stage, implemented by operating the first, second and fourth clutches;
a seventh forward speed stage, implemented by operating the first and second clutches, and the first brake;
an eighth forward speed stage, implemented by operating the second and fourth clutches and the first brake;
a ninth forward speed stage, implemented by operating the first and fourth clutches, and the first brake;
a forward tenth speed stage, implemented by operating the third and fourth clutches, and the first brake; and
a reverse-speed stage, implemented by operating the third clutch, and the first and second brakes.

* * * * *